C. H. BOUCHER.
VARIABLE SPEED GEARING.
APPLICATION FILED NOV. 10, 1911.
1,047,735.
Patented Dec. 17, 1912.
2 SHEETS—SHEET 1.
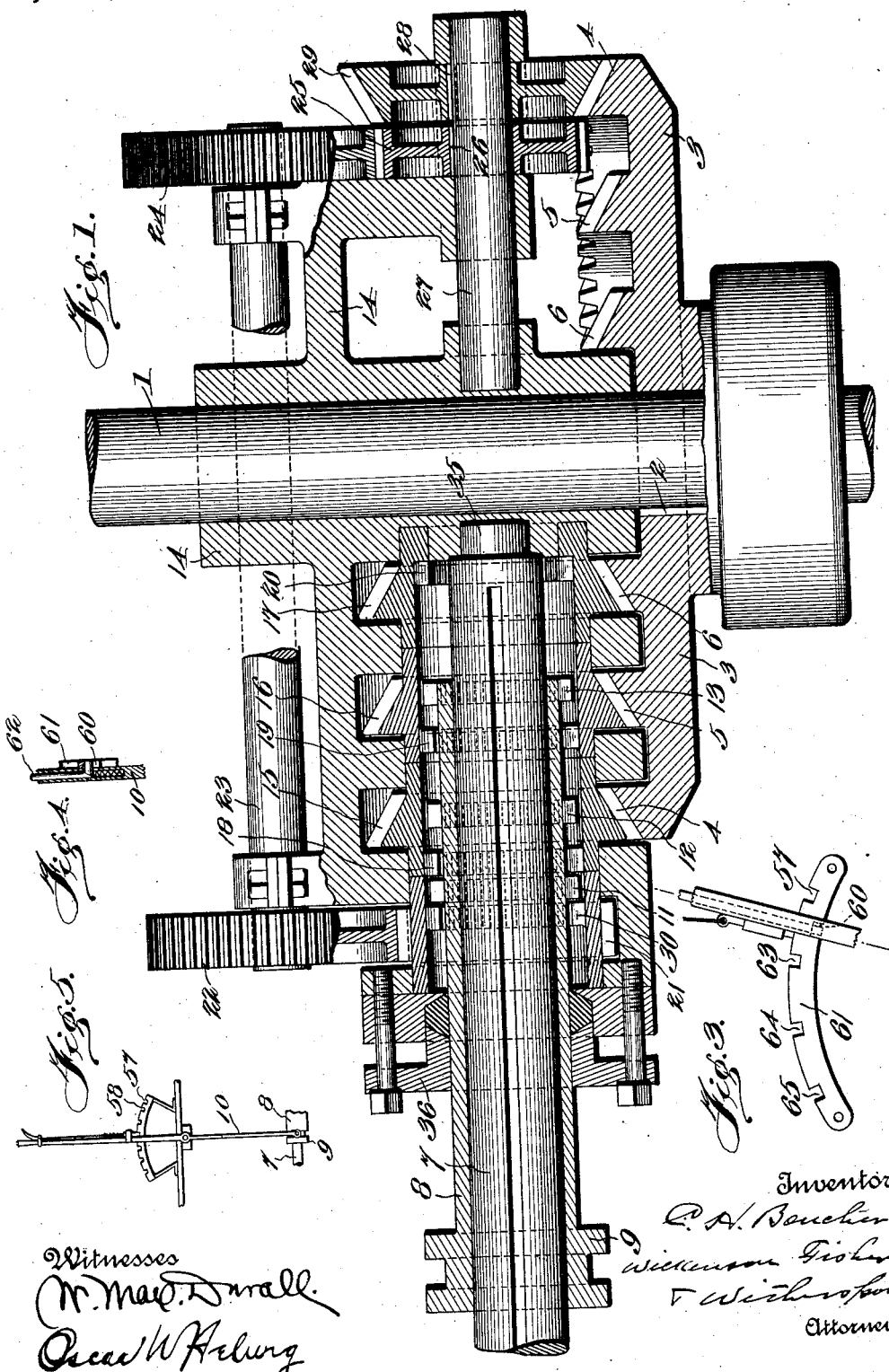

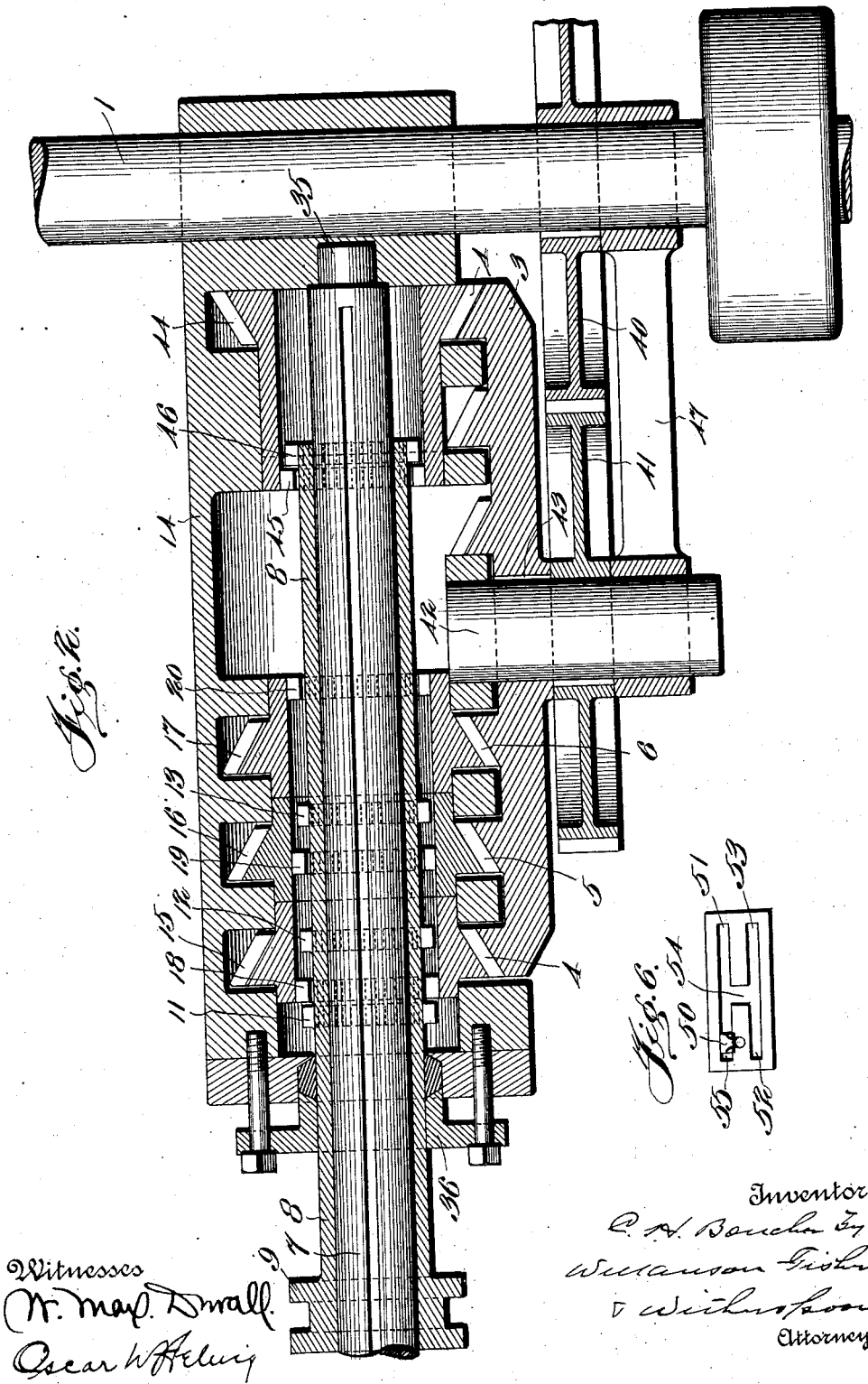

UNITED STATES PATENT OFFICE.

CREED H. BOUCHER, OF THE UNITED STATES NAVY.

VARIABLE-SPEED GEARING.

1,047,735.
Specification of Letters Patent. Patented Dec. 17, 1912.
Application filed November 10, 1911. Serial No. 659,604.

*To all whom it may concern:*

Be it known that I, CREED H. BOUCHER, ensign United States Navy, a citizen of the United States, at present attached to the U. S. S. *Des Moines*, have invented certain new and useful Improvements in Variable-Speed Gearing; and I do hereby declare the following to be a full, clear, and exact description of the invention, such as will enable others skilled in the art to which it appertains to make and use the same.

This invention relates to change speed transmission gearing adapted for general use, but especially applicable to automobiles and mechanically propelled vehicles in general, and has for its object to provide a mechanism of a sliding selective type which will be simple in construction comparatively inexpensive to manufacture, certain in action, not liable to get out of order through excessive wear, and one which insures only a single set of gears being thrown into operation at a time, while enabling the machine to be readily reversed at will, and all the operations controlled by means of a single lever moving over a simple arc.

With these and other objects in view, the invention consists in the novel details of construction and combinations of parts more fully hereinafter disclosed and particularly pointed out in the claims.

Referring to the accompanying drawings forming a part of this specification, in which like numerals designate like parts in all the views:—

Figure 1 is an enlarged sectional view of a change speed gearing made in accordance with my invention, and showing the parts in their neutral position; Fig. 2 is a view similar to Fig. 1, but illustrating a modified form of my invention; Fig. 3 is a fragmentary detail view illustrating a preferred form of controlling lever; Fig. 4 is a sectional detail view of certain of the parts shown in Fig. 3; Fig. 5 is a modified form of controlling lever which might be employed in connection with my change speed gearing; and, Fig. 6 is a diagrammatic plan view illustrating the H form of slot now frequently used in connection with change speed gearing on mechanically propelled vehicles.

1 indicates a rear axle, or driven shaft, having a multiple bevel gear 3 secured thereto, or to the usual differential for driving said axle; said wheel 3 being provided with co-axial annular series of bevel faces 4, 5 and 6.

7 represents the driving shaft to which is splined the sleeve 8 carrying the collar 9 to which may be fitted any suitable operating lever 10 as illustrated, for example, in Fig. 5. The said sleeve 8 is rotatable with the shaft 7, as well as slidable thereon, and has rigidly secured thereto sets of projections 11, 12 and 13, one for each change of speed.

14 represents the frame through which the axle 1 passes, and the said frame receives the said driving shaft 7 and sleeve 8 as shown, as well as a plurality of bevel gears 15, 16 and 17 adapted to respectively intermesh with the bevel gears 4, 5 and 6 as shown. Each of the gears 15, 16 and 17 is movable independently of the other, and is hollow in order to receive the said sleeve 8 as shown. Said gears 15, 16 and 17 also carry sets of internal projections 18, 19 and 20 respectively, with which the projections 11, 12 and 13 are adapted respectively to engage at different times. That is to say, as will more clearly appear below, the projections 11, 12 and 13 are so spaced with respect to the spacing of the internal projections 18, 19 and 20, that as the sleeve 8 slides along the shaft 7, only one set of projections, such as 11, can engage with one set of internal projections, such as 18, at the same time.

The other projections, such as 12 or 13, are so spaced with respect to the internal projections, such as 19 or 20, that when the projections 11 engage the internal projections 18, the projections 12 or 13 will be out of mesh with the internal projections 19 and 20 respectively. The spacing is further so selected, as is illustrated in Fig. 1, that the sleeve 8 may be brought into its neutral position as shown, when none of the projections will interengage.

In addition to the hollow gears 15, 16 and 17, I also provide a hollow gear 21 having straight teeth adapted to intermesh with a gear 22 mounted on one end of a shaft 23 carrying at its other end a gear 24 meshing with a gear 25, rigid as at 26 with a short shaft 27 mounted in the framework 14, and which shaft 27 has secured thereto, as at 28, a bevel gear 29 meshing with the bevel gear 4 on the wheel 3, as shown.

So far as has now been disclosed, it is evident that whenever the sleeve 8 is forced from its neutral position illustrated in Figs.

1 and 2 toward the right, as seen in said figures, the projections 11 will first intermesh with the internal projections 18, and therefore power will be transmitted from the driving shaft 7 to the sleeve 8, projections 11, internal projections 18, hollow bevel gear 15, bevel gear 4, disk 3, spline 2, and driven shaft 1. Further, the bevel gear 4 having a greater radius than the bevel gears 5 and 6, this power will be transmitted at a lower speed than would be the case if the sleeve 8 should be pushed sufficiently far toward the right as to cause the projections 12 to engage with the internal projections 19. In the same way, the power which would be transmitted from the shaft 7 to the shaft 1 when the projections 12 and 19 are in engagement, will be at a lower speed than will be the power which is transmitted when the sleeve 8 is still further moved toward the right to cause engagement of the projections 13 and 20. On the other hand, when the sleeve 8 is moved from the position shown in Figs. 1 and 2 toward the left, as shown in said figures, the projections 11 will engage the internal gear 30 rigid with the said hollow projections 21, and power will be transmitted from the driving shaft 7 to the sleeve 8, projections 11 and 30, straight gear 21, gear 22, shaft 23, gear 24, gear 25, spline 26, short shaft 27, spline 28, gear 29, bevel gear 4, disk 3, and driven shaft 1; but in this case, it is evident the rotation of the shaft 1 will be reversed.

I preferably provide each of the hollow gears 21, 15, 16 and 17 with suitable bearings in the casing 14, as illustrated, and I also preferably provide the right hand end of the shaft 7 with a bearing in said casing or frame 14, as shown at 35. Any suitable stuffing box 36 may be provided to keep dust from the parts, as well as to prevent oil from escaping.

Fig. 2 illustrates a modification, in which the shaft, or rear axle, 1 is driven by a gear 40 secured thereto, or to the usual differential for driving said axle; said gear 40 intermeshing with a gear 41 on the short shaft 42 to which is rigidly attached as at 43 the bevel gear 3. The shaft 42 may be conveniently mounted in a bearing 47 suitably connected with the framework 14. Further, instead of the hollow straight gear 21, shown in Fig. 1, I have provided the hollow bevel gear 44 located near the axle 1 which in turn carries the internal projections 45 adapted to engage the projections 46 carried by the inner end of the sleeve 8, as will be clear from the drawings. The gear 44 intermeshes with the bevel gear 4 as illustrated, and it will be clear that when the sleeve 8 is moved to the left as shown in Fig. 2, so as to cause engagement of the projections 46 and 45, power will be transmitted from the shaft 7, sleeve 8, projections 46 and 45, bevel gear 44, disk 3, shaft 41, gear 40 and driven shaft 1; but it will constitute the reverse movement for this modification. Of course the shaft 1 may be driven in its forward direction by throwing the sleeve 8 to the right as seen in Fig. 2, and causing the projections 11, 12 or 13 to engage with the coöperating internal projections 18, 19 or 20, as has been disclosed above in connection with Fig. 1.

An important feature of my invention consists in the construction above disclosed by which the movement of the operating lever 10 in a single direction enables one to change the speed of the machine at will, or to stop the same as will now be disclosed. That is to say, referring to Fig. 6, it is well known that in a large number of automobiles now in use, the operating lever 50 has to be moved from whatever position it may be in, to the position 51 in order to throw in the lowest speed, and it then has to be moved from the position 51 to the position 52 in order to attain the next highest speed, passing through the neutral point 54 in the meantime. The said lever 50, in order to attain its highest speed, must next be thrown to the position 53, and in order to reverse the machine, the lever being in the position 53, it is necessary to move the same from said position 53 back through the neutral point to the position 55. In other words, it will be clear that in order to go from the lowest to the next highest speed, and also to go from the highest speed to the reverse position, or from the reverse position to the highest speed, it is always essential in such arrangements to pass through the neutral point 54. As will be seen from Fig. 6, these complicated movements constitute the letter H and are very confusing to the operator, especially in times of panic, when great danger is impending. On the other hand, by referring to Fig. 5, my lever 10 may be thrown from the reverse position 57 to the neutral position 58 and then by a continuous movement in the same direction, I may throw in the successive speeds, thereby avoiding all confusion at any time. In the form of arc shown in Fig. 5, I have indicated a plurality of notches, which may be utilized for additional speeds, or if desired I may provide a neutral position between each successive speed. In the preferred form of arc, however, illustrated in Fig. 3, I have illustrated the reverse position at 57, and the neutral position I have indicated at 60, which may be conveniently provided by a notch on the lower side of the rack 61, controlled by a push pin, such as 62, or by any other suitable means, as is best illustrated in Fig. 4. As shown in Fig. 3, the notch 63 corresponds to the lower speed, the notch 64 to the next highest, and the notch 65 to the highest speed.

In all cases it will be observed that a continuous counter clockwise movement of the operating lever, as shown in the drawings, will produce successively higher speeds, and a clockwise movement will proceed at successively lower speeds until the neutral point is reached. A further clockwise movement produces a reversal of the machine, and therefore no confusion can arise in times of extreme danger.

Especial attention is called to the fact that in many of the usual types of change speed gearing now employed, a plurality of gear wheels intermesh on their peripheries, which fact prevents more than one or two teeth engaging at the same time, and therefore necessitates the parts being made sufficiently large to transmit all of the power through not more than two teeth, and further, owing to the loose engagement of these said teeth, this power is really generally transmitted through only one tooth on each intermeshing gear, and consequently the parts must be made really sufficiently large and strong to drive the vehicle through only a single pair of intermeshing teeth.

In my improved construction, all of the projections 11, 12 and 13 engage the cooperating sets of internal projections 18, 19 and 20, whereby the power is transmitted through a very large number of projections or teeth, which enables the parts to be made very much smaller and lighter than would be the case if external engaging gears were employed. This feature becomes of especial importance when it is remembered that sudden and powerful changes of power are often had, and there is always a greater or less danger of stripping the teeth unless an ample margin of safety in the strength of the parts is provided. It will be further observed that I provide a direct drive for every speed, and therefore I save the inevitable frictional losses incident to indirect drives and peripheral engagements, besides producing a gearing free from the noise that is always attendant upon externally engaging gears. Further, since the gears 4, 5 and 6 are always in mesh with the gears 15, 16 and 17, these said gears may be equipped with theoretically perfect teeth and thereby avoid well known objections to the old style of gears now in use on automobiles.

Of course, in practice, the whole change gearing and its coacting parts will be inclosed in a suitable casing not shown.

It is obvious that those skilled in the art may vary the details of construction as well as the arrangement of parts without departing from the spirit of my invention, and therefore I do not wish to be limited to the above disclosure except as may be required by the claims.

What I claim is:—

1. In a variable speed gearing the combination of a driving shaft; a sliding sleeve secured to said shaft provided with a plurality of driving projections spaced apart at varying distances; a plurality of independent hollow external gears and carrying internal projections also variably spaced apart each adapted to intermesh at different times with certain of said driving projections; a multiple gear wheel with which said external gears are adapted to intermesh; and a shaft adapted to be driven by said wheel, substantially as described.

2. In a variable speed gearing the combination of a driving shaft; a sliding sleeve secured to said shaft provided with a plurality of driving projections spaced apart at varying distances; a plurality of independent hollow external gears and carrying internal projections also variably spaced apart each adapted to intermesh at different times with certain of said driving projections; a framework adapted to receive said gears and pinions; a multiple gear wheel supported on said framework with which said external gears are adapted to intermesh; and a shaft adapted to be driven by said wheel, substantially as described.

3. In a variable speed gearing the combination of a driving shaft; a sleeve thereon provided with external projections; a series of independent gears provided with internal projections for engagement by said external projections; a plurality of rigidly connected gears meshing with said series of independent gears; a shaft adapted to be driven by said plurality of gears; a reversing gear adapted to intermesh with certain of said external projections; and connections between said reversing gear and driven shaft, substantially as described.

4. In a variable speed gearing, the combination of a driving shaft; a driven shaft; and connections between said driving and driven shafts comprising a plurality of variably spaced movable sets of projections, a plurality of variably spaced driving gears with which said sets of projections are adapted to engage one at a time; and a reversing gear with which one of said sets of projections is also adapted to engage; and an operating lever adapted to move in one direction in order to cause successive engagements between said movable sets of projections and said driving gears, substantially as described.

5. In a variable speed gearing, the combination of a driving shaft; a driven shaft; and connections between said driving and driven shafts comprising a plurality of variably spaced movable sets of projections, a sliding sleeve carrying said sets of projections, a plurality of variably spaced driving gears with which said sets of projections are adapted to engage one at a time, and a reversing gear with which one of said sets of projections is also adapted to engage; a hollow framework adapted to receive said sets of projections and driving gears; and an operating lever adapted to move in one direction in order to cause a disengagement between one of said sets of projections and said reversing gear and successive engagements between said sets of projections and said driving gears, substantially as described.

6. In a variable speed gearing for automobiles the combination of a driving shaft; a driven shaft; connections between said shafts comprising slidingly movable variably spaced sets of coöperating projections, revolubly mounted direct driving gears, a revolubly mounted reversing gear and a multiple gear; and a controlling means for said connections adapted to move from its reversing position in one direction in order to attain its neutral and its various change speed positions, substantially as described.

In testimony whereof, I affix my signature, in presence of two witnesses.

CREED H. BOUCHER.

Witnesses:
T. A. WITHERSPOON,
GEO. B. PITTS.

---

Copies of this patent may be obtained for five cents each, by addressing the "Commissioner of Patents, Washington, D. C."